United States Patent
Matsuda et al.

(10) Patent No.: US 10,656,826 B2
(45) Date of Patent: May 19, 2020

(54) OUTPUT CONTROL APPARATUS FOR CONTROLLING OUTPUT OF CONTENTS, OUTPUT CONTROL METHOD, AND STORAGE MEDIUM

(71) Applicant: CASIO COMPUTER CO., LTD., Tokyo (JP)

(72) Inventors: Hideaki Matsuda, Tokyo (JP); Masahiro Oda, Tokyo (JP); Koki Dobashi, Tokyo (JP); Junichi Hato, Tokyo (JP); Shogo Hashimoto, Tokyo (JP); Hiroyuki Kato, Tokyo (JP); Hiroyoshi Ogawa, Tokyo (JP); Ryo Okumura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 92 days.

(21) Appl. No.: 15/474,069

(22) Filed: Mar. 30, 2017

(65) Prior Publication Data

US 2017/0364255 A1    Dec. 21, 2017

(30) Foreign Application Priority Data

Jun. 15, 2016 (JP) .................... 2016-118488

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0482* (2013.01); *G06F 3/04847* (2013.01);
(Continued)

(58) Field of Classification Search
CPC .............................. G06F 3/0488; G06F 3/0484
See application file for complete search history.

(56) References Cited

U.S. PATENT DOCUMENTS

2004/0046887 A1   3/2004   Ikehata et al.
2010/0020221 A1   1/2010   Tupman et al.
(Continued)

FOREIGN PATENT DOCUMENTS

CN    102760005 A    10/2012
CN    103616973 A    3/2014
(Continued)

OTHER PUBLICATIONS

CNIPA; Application No. 201710180248.4; Office Action dated Oct. 28, 2019.

(Continued)

*Primary Examiner* — David E Choi
(74) *Attorney, Agent, or Firm* — Fitch, Even, Tabin & Flannery LLP

(57) ABSTRACT

An imaging apparatus includes a first detecting unit configured to detect the trajectory of a first touch operation which is a touch operation which is performed while contact with a touch panel is kept, a setting unit configured to set a touch operation area having a shape according to the trajectory of the first touch operation detected, a second detecting unit configured to detect a second touch operation which is a touch operation on the set touch operation area, and an output control unit 10e configured to control content output on the basis of the detected second touch operation.

13 Claims, 10 Drawing Sheets

(51) Int. Cl.
*H04N 5/77* (2006.01)
*H04N 5/232* (2006.01)
*G06F 3/0482* (2013.01)
*G11B 27/10* (2006.01)
*G06F 3/0484* (2013.01)
*G11B 27/00* (2006.01)
*H04N 9/87* (2006.01)

(52) U.S. Cl.
CPC .......... *G11B 27/005* (2013.01); *G11B 27/102* (2013.01); *H04N 5/23216* (2013.01); *H04N 5/23293* (2013.01); *H04N 5/232935* (2018.08); *H04N 5/772* (2013.01); *H04N 9/87* (2013.01); *G06F 2203/04808* (2013.01)

(56) References Cited

U.S. PATENT DOCUMENTS

| | | |
|---|---|---|
| 2013/0249834 A1 | 9/2013 | Li |
| 2014/0143688 A1* | 5/2014 | Hou ............... G06F 3/0488 715/760 |
| 2014/0317498 A1* | 10/2014 | Okumura ........... G06F 3/016 715/702 |
| 2014/0325443 A1* | 10/2014 | Kim ............... G06F 3/0482 715/825 |
| 2015/0169072 A1* | 6/2015 | Wei ............... G06F 3/04842 345/156 |
| 2016/0034101 A1 | 2/2016 | Zongmin |
| 2016/0054887 A1* | 2/2016 | Tumwattana ...... G06F 3/0488 715/810 |
| 2017/0105053 A1* | 4/2017 | Todd ............... H04N 21/816 |
| 2017/0364255 A1* | 12/2017 | Matsuda ........... H04N 5/772 |

FOREIGN PATENT DOCUMENTS

| | | |
|---|---|---|
| EP | 2386938 A2 | 11/2011 |
| JP | 2004-104594 A | 4/2004 |
| JP | 2010-176575 A | 8/2010 |
| JP | 2011-221821 A | 11/2011 |
| JP | 2013-041333 A | 2/2013 |
| JP | 2014-123159 A | 7/2014 |

OTHER PUBLICATIONS

JPO; Application No. 2016-118488; Notification of Reasons for Refusal dated Mar. 5, 2019.

* cited by examiner

*FIG. 2*

CONTROL ASSOCIATION TABLE T

| FEATURE OF TRAJECTORY | CONTROL CONTENT |
|---|---|
| SHAPE: CIRCLE | FAST/SLOW REPRODUCTION AND SETTING OF START POINT AND END POINT |
| SHAPE: VERTICAL STRAIGHT LINE | VOLUME ADJUSTMENT |
| SHAPE: L-SHAPED LINE (HAVING VERTICAL STRAIGHT-LINE SEGMENT AND HORIZONTAL STRAIGHT-LINE SEGMENT) | SEARCHING OF DISPLAY FRAME |
| ⋮ | ⋮ |

OUTPUT CONTROL APPARATUS FOR CONTROLLING OUTPUT OF CONTENTS, OUTPUT CONTROL METHOD, AND STORAGE MEDIUM

CROSS-REFERENCE TO RELATED APPLICATION

This application is based upon and claims the benefit of priority from the prior Japanese Patent Application No. 2016-118488 filed on Jun. 15, 2016, and the entire contents of which are incorporated herein by reference.

BACKGROUND OF THE INVENTION

1. Field of the Invention

The present invention relates to an output control apparatus, an output control method, and a storage medium.

2. Description of the Related Art

In the related art, there is known a display apparatus having an operation unit enabling a user to perform speed adjustment such as fast forwarding, rewinding, and slow motion reproduction in reproducing videos. However, the operation unit is provided separately from a video display unit, and thus hinders the display apparatus from being downsized.

For this reason, there have been disclosed technologies for controlling the speed of video reproduction according to the direction and speed of a slide operation on a touch panel, for example, as disclosed in Japanese Patent Application Laid-Open No. 2004-104594. Also, there have been disclosed technologies for semi-transparently displaying a plurality of reproduction speeds on the display of a video such that a user can recognize the relation between positions on a touch panel and the reproduction speeds, for example, as disclosed in Japanese Patent Application Laid-Open No. 2010-176575.

SUMMARY OF THE INVENTION

An output control apparatus according to an exemplary embodiment comprises:
a touch input unit on which a user performs a touch operation; and
a processor that is configured to:
  detect the trajectory of a first touch operation which is a touch operation which is performed while contact with the touch input unit is kept,
  specify a touch operation area having a shape according to the trajectory of the first touch operation detected, on the touch input unit,
  detect a second touch operation which is a touch operation on the specified area, and
  control content output on the basis of the detected second touch operation.

An output control method using an output control apparatus having a touch input unit on which a user performs a touch operation, according to an exemplary embodiment, comprises:
detecting the trajectory of a first touch operation which is a touch operation which is performed while contact with the touch input unit is kept;
specifying a touch operation area having a shape according to the trajectory of the first touch operation detected, on the touch input unit;
detecting a second touch operation which is a touch operation on the specified touch operation area; and
controlling content output on the basis of the detected second touch operation.

A non-transitory storage medium according to an exemplary embodiment is a non-transitory storage medium storing a computer-readable program for controlling a computer of an output control apparatus having a touch input unit on which a user performs a touch operation, the computer-readable program causing the computer to perform functions of:
detecting the trajectory of a first touch operation which is a touch operation which is performed while contact with the touch input unit is kept;
specifying a touch operation area having a shape according to the trajectory of the first touch operation detected, on the touch input unit;
detecting a second touch operation which is a touch operation on the specified touch operation area; and
controlling content output on the basis of the detected second touch operation.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

If the following description is considered in conjunction with the following drawings, it is possible to more deeply understand this application.

FIG. 2 is a view illustrating an example of a control association table stored in the imaging apparatus of FIG. 1.

DETAILED DESCRIPTION

Figure 1:
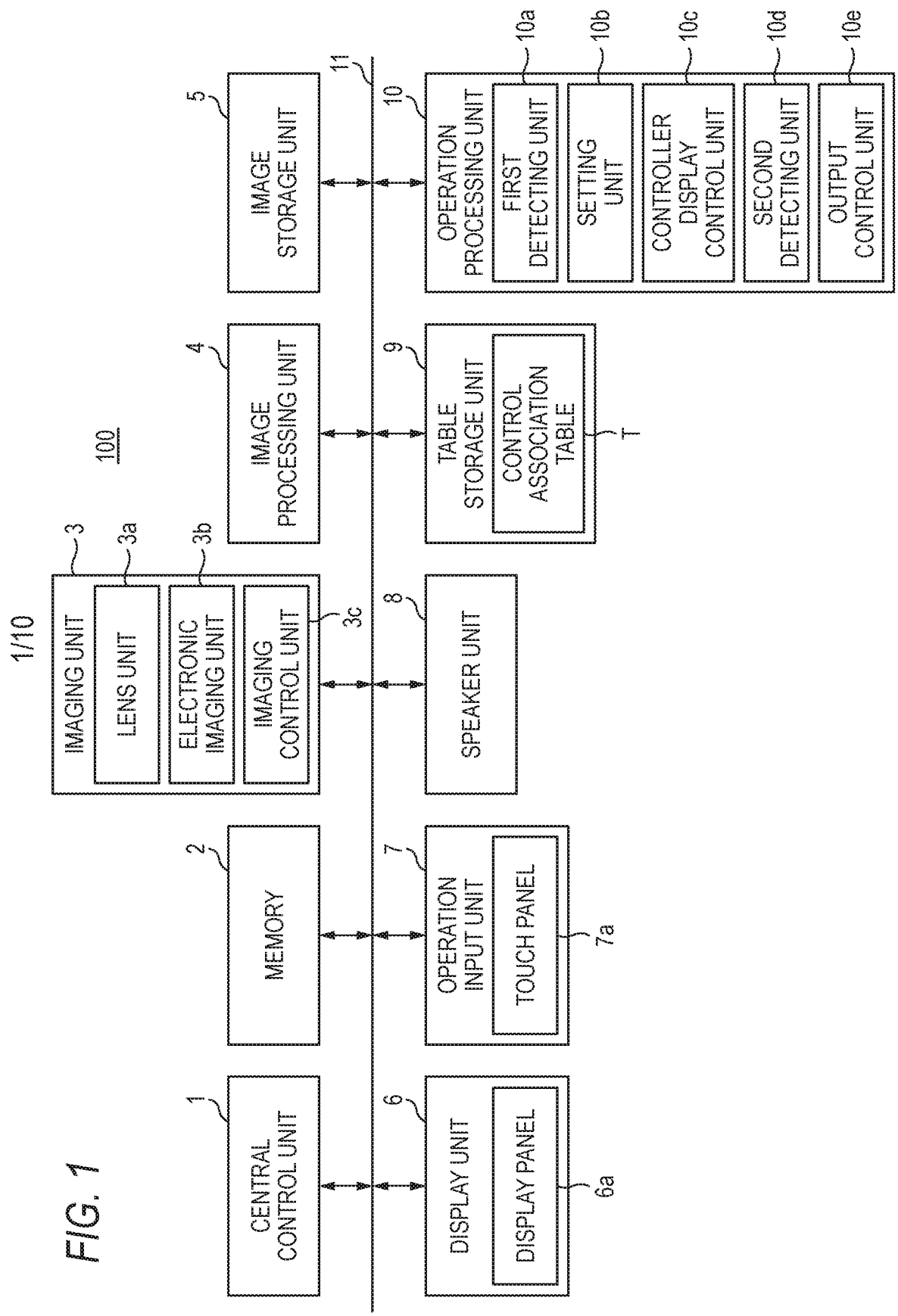
FIG. 1 is a block diagram illustrating a rough configuration of an imaging apparatus of an embodiment according to the present invention.

Hereinafter, with respect to the present invention, specific modes will be described with reference to the accompanying drawings. However, the scope of the invention is not limited to examples shown in the drawings.

FIG. 1 is a block diagram illustrating a rough configuration of an imaging apparatus 100 of an embodiment according to the present invention.

As shown in FIG. 1, specifically, the imaging apparatus 100 of the present embodiment includes a central control unit 1, a memory 2, an imaging unit 3, an image processing unit 4, an image storage unit 5, a display unit 6, an operation input unit 7, a speaker unit 8, a table storage unit 9, and an operation processing unit 10.

Also, the central control unit 1, the memory 2, the imaging unit 3, the image processing unit 4, the image storage unit 5, the display unit 6, the operation input unit 7, the speaker unit 8, the table storage unit 9, and the operation processing unit 10 are connected by a bus line 11.

The central control unit 1 is for controlling the individual units of the imaging apparatus 100. Specifically, the central control unit 1 includes a central processing unit (CPU) and like (not shown in the drawings), and performs various control operations according to various processing programs (not shown in the drawings) for the imaging apparatus 100.

The memory 2 may be configured by a dynamic random access memory (DRAM) or the like, and temporarily stores data and the like which are processed by the central control unit 1, the operation processing unit 10, and the like.

The imaging unit 3 images photogenic subjects at a certain imaging frame rate, thereby generating frame images. Specifically, the imaging unit 3 includes a lens unit 3a, an electronic imaging unit 3b, and an imaging control unit 3c.

The lens unit 3a is composed of a plurality of lenses such as a zoom lens and a focusing lens.

The electric imaging unit 3b is composed of an image sensor (an imaging element) such as a charge coupled device (CCD) or a complementary metal-oxide semiconductor (CMOS). In this configuration, the electric imaging unit 3b receives optical images through the various lenses of the lens unit 3a, and converts the optical images into 2D-image signals.

The imaging control unit 3c controls imaging of the imaging unit 3 on photogenic subjects.

The imaging control unit 3c includes a timing generator, a driver, and the like (not shown in the drawings). In this configuration, the imaging control unit 3c drives the electric imaging unit 3b by the timing generator and the driver such that the electric imaging unit performs scanning, and controls the electric imaging unit 3b such that the electric imaging unit converts optical images received through the lens unit 3a, into 2D-image signals, at predetermined intervals, and reads out frame images from an imaging area of the electric imaging unit 3b, one scene by one scene, and outputs the read frame images to the image processing unit 4.

Further, the imaging control unit 3c performs control on conditions for imaging photogenic subjects, such as AF (automatic focusing), AE (automatic exposure), and AWB (automatic white balance).

Also, the imaging unit 3 may include a diaphragm for adjusting the amount of light traversing the lens unit 3a, a zoom drive unit for moving the zoom lens in an optical axis direction, a focusing unit for moving the focusing lens in the optical axis direction, and the like (all of which are not shown in the drawings), in addition to the lens unit 3a, the electric imaging unit 3b, and the imaging control unit 3c.

The image processing unit 4 performs a variety of image signal processing on analog frame image signals transmitted from the electric imaging unit 3b. Specifically, the image processing unit 4 appropriately performs gain adjustment on an analog frame image signal transmitted from the electric imaging unit 3b, with respect to each of R, G, and B color components, and samples and holds the analog frame image signal by a sample-and-hold circuit (not shown in the drawings), and converts the analog frame image signal into digital data by an A/D converter (not shown in the drawings), and performs color processing including a pixel interpolation process and a gamma correction process on the digital data by a color processing circuit (not shown in the drawings), and generates a digital luminance signal Y and digital color-difference signals Cb and Cr (YUV data).

The luminance signal Y and the color-difference signals Cb and Cr which are output from the color processing circuit are transmitted to the memory 2 which is used as a buffer memory, thorough a DMA controller (not shown in the drawings), by DMA transfer.

The image storage unit 5 may be composed of a non-volatile memory (a flash memory), and in the image storage unit, image data on still images and videos encoded in a predetermined compression format by an encoding unit (not shown in the drawings) of the image processing unit 4 are stored.

As examples of video file formats, there are H.264/AVC and a MOV format in which the number of pixels in a horizontal direction and the number of pixels in a vertical direction are 1280 and 720, respectively, and whose imaging frame rate is 30 fps. Also, in a case where a video has sound, the sound is encoded, for example, in an IMA-ADPCM format (stereo sound).

Also, image data stored in the image storage unit 5 may be image data acquired by the imaging unit 3 of the imaging apparatus 100 and stored in the image storage unit, and may be image data acquired by an external imaging apparatus (not shown in the drawings) and transmitted to the imaging apparatus 100 and stored in the image storage unit 5.

Also, the image storage unit 5 may be configured such that a storage medium (not shown in the drawings) can be loaded to and unloaded from the image storage unit, and the image storage unit can control reading of data from a loaded storage medium and writing of data onto a storage medium.

The display unit 6 displays images on the display screen of a display panel 6a.

In other words, the display unit 6 displays designated images on the display screen of the display panel 6a on the basis of image data having a predetermined size and obtained by decoding of the image processing unit 4. Also, the display unit 6 reproduces videos made at certain imaging frame rates, at a predetermined reproduction frame rate (for example, 30 fps), under control of an output control unit 10e of the operation processing unit 10, as will be described below.

Also, the display panel 6a is composed of, for example, a liquid crystal display panel or an organic EL (electro-luminescence) display panel. However, this is an example, and does not limit the present invention.

The operation input unit 7 is for performing predetermined operations on the imaging apparatus 100. Specifically, the operation input unit 7 includes a shutter button related to an instruction for acquiring a still image of a photogenic subject, an instruction for starting to make a video, and an instruction for finishing making of a video, a selection determination button related to instructions for selecting an imaging mode, a reproduction mode, a function, or the like, a zoom button related to an instruction for adjusting the amount of zooming, and the like (all of which are not shown).

When various buttons are operated by a user, the operation input unit 7 outputs operation instructions according to the operated buttons, to the central control unit 1. The central control unit 1 performs control according to the operation instructions input from the operation input unit 7 such that the individual units perform predetermined operations (for example, video reproduction).

Also, the operation input unit 7 includes a touch panel 7a provided integrally with the display panel 6a of the display unit 6.

The touch panel 7a detects the positions of direct or indirect touches of user's fingers (hands), touch pens, and the like on the display screen of the display panel 6a forming a display area. In other words, the touch panel 7a may be provided on the display screen of the display panel 6a or may be provided on the inner side from the display screen, and detects the X and Y coordinates of the positions of touches on the display screen with a predetermined sampling period by various systems such as an electrostatic capacity system, a resistive film system, and an ultrasonic surface acoustic wave system. Then, the touch panel 7a outputs position signals related to the X and Y coordinates of the positions of the touches, to the operation processing unit 10.

In a case of reproducing videos with sound, the speaker unit 8 performs D/A conversion on sound data of the videos by a data converting unit (not shown in the drawings) under control of the CPU of the central control unit 1, thereby outputting the sound. Also, the speaker unit 8 may output operation tones according to some user's operations on the operation input unit 7, and may output alarm tones.

The table storage unit (a storage unit) 9 has a control association table T (see FIG. 2) to be used in a reproducing process (to be described below).

The control association table T is used in a case where a first touch operation is a swiping operation, and specifically includes an item "FEATURE OF TRAJECTORY" and an item "CONTROL CONTENT" associated with each other as shown in FIG. 2.

The item "FEATURE OF TRAJECTORY" is an item representing features of trajectories of user's first touch operations (to be described below). There is a plurality of first touch operations different in some features such as the shapes of their trajectories (such as a circle, a straight line, an L-shaped line, and a curve) and amounts of pressing on a pressing-amount detecting type touch panel. In the control association table T shown in FIG. 2, as feature examples of the item "FEATURE OF TRAJECTORY", trajectory features different in the shapes of the trajectories of first touch operations are shown.

The item "CONTROL CONTENT" is an item representing various different control contents which are performed when videos are reproduced. Also, the variety of control defined in the item "CONTROL CONTENT" is performed on the basis of second touch operations (to be described below) on controller images C (see FIG. 5B and the like), and in the present embodiment, the types of controller images C depend on the control contents included in the item "CONTROL CONTENT" (this will be described in detail).

Specifically, a trajectory feature "SHAPE: CIRCLE" of the item "FEATURE OF TRAJECTORY" represents a circular trajectory shape, and is associated with a control content "FAST/SLOW REPRODUCTION AND SETTING OF START POINT AND END POINT" of the item "CONTROL CONTENT" for fast or slowly performing forward or backward reproduction of a reproduction object video in units of the predetermined number of frame images (for example, frame forward reproduction in units of one frame image) and setting frame images to be a reproduction start point and a reproduction end point. Also, a trajectory feature "SHAPE: VERTICAL STRAIGHT LINE" of the item "FEATURE OF TRAJECTORY" represents a straight line trajectory shape extending in a vertical direction (a y axis direction), and is associated with a control content "VOLUME ADJUSTMENT" of the item "CONTROL CONTENT" for adjusting volume. Also, a trajectory feature "SHAPE: L-SHAPED LINE (HAVING VERTICAL STRAIGHT-LINE SEGMENT AND HORIZONTAL STRAIGHT-LINE SEGMENT)" of the item "FEATURE OF TRAJECTORY" represents a line trajectory shape having a straight line segment extending in the vertical direction (the y axis direction) and a straight line segment extending in a horizontal direction (an x axis direction), and is associated with a control content "SEARCHING OF DISPLAY FRAME" of the item "CONTROL CONTENT" for searching for a frame image to be displayed on the display panel 6a.

Also, the items "FEATURE OF TRAJECTORY" and "CONTROL CONTENT" of the control association table T described above are just examples, and the control association table is not limited thereto and can be appropriately and arbitrarily modified.

Also, different trajectory features of the item "FEATURE OF TRAJECTORY" may be associated with a common control content of the item "CONTROL CONTENT".

The operation processing unit 10 includes a first detecting unit 10a, a setting unit 10b, a controller display control unit 10c, a second detecting unit 10d, and an output control unit 10e.

Although each unit of the operation processing unit 10 is composed of, for example, some logic circuits, this configuration is just an example, and the present invention is not limited thereto.

The first detecting unit 10a detects the trajectories of first touch operations.

A first touch operation is a touch operation which a user performs while keeping contact with the touch panel 7a, and when a user performs a first touch operation, the first detecting unit (a first detecting unit) 10a detects the trajectory of the first touch operation.

Examples of first touch operations include a swiping operation of continuously a user's operation of bringing one finger (such as a forefinger) into contact with the touch panel 7a and then continuously touching different positions on the touch panel 7a with that finger, a user's pinch operation of bringing two fingers (such as a forefinger and a thumb) into contact with the touch panel 7a and then continuously touching different positions on the touch panel 7a with each of those fingers, and the like.

Specifically, the touch panel 7a outputs position signals on the X and Y coordinates of touch positions touched by a user's first touch operation, to the operation processing unit 10. While the user is touching the touch panel 7a, the touch panel 7a sequentially outputs position signals, and the first detecting unit 10a sequentially receives the position signals. Then, on the basis of the position signals sequentially received according to the user's touch operation, the first detecting unit 10a detects the trajectory of the first touch operation. For example, in a case where the first touch operation is a swiping operation, a trajectory representing movement in one direction is detected; whereas in a case where the first touch operation is a pinch operation, a trajectory representing movement in two directions is detected.

The setting unit 10b sets a touch operation area "A" on the touch panel 7a.

In other words, the setting unit 10b sets a touch operation area "A" having a shape according to the trajectory of the first touch operation detected by the first detecting unit 10a.

Specifically, in a case where the first touch operation is a swiping operation, the setting unit 10b determines whether the feature of the trajectory of the first touch operation detected by the first detecting unit 10a (such as a feature in which the shape of the trajectory is a circle) coincides with any preset trajectory feature (such as a trajectory feature "SHAPE: CIRCLE"), with reference to the field of the item "FEATURE OF TRAJECTORY" of the control association table T stored in the table storage unit 9. When determining that the feature of the trajectory of the first touch operation coincides with a preset trajectory feature, the setting unit 10b sets a touch operation area "A" having a size corresponding to the size of the trajectory of the first touch operation, at a position on the touch panel 7a corresponding to the trajectory of the first touch operation.

Further, with reference to the field of the item "CONTROL CONTENT" stored in the control association table T in association with the trajectory feature of the item "FEATURE OF TRAJECTORY" representing the trajectory features of various first touch operations, the setting unit 10b sets a control content for reproducing a video (for example, in a case where the feature of the trajectory of the first touch operation is the trajectory feature "SHAPE: CIRCLE", the control content "FAST/SLOW REPRODUCTION AND SETTING OF START POINT AND END POINT"). In other words, the setting unit 10b sets a control content depending on the feature of the trajectory of the first touch operation.

Also, in a case where the first touch operation is a pinch operation (a predetermined type of touch operation), the setting unit 10b sets a touch operation area "A" having a size according to the size of the trajectory of the first touch operation, at a position on the touch panel 7a corresponding to the trajectory of the first touch operation. Further, the setting unit 10b sets movement of a portion of the video to be displayed in a changed size (for example, a portion of the video to be displayed in a larger size), as a control content for reproducing the video.

Also, when the second detecting unit detects finish of a user's second touch operation (to be described below) on the touch operation area "A", the setting unit 10b cancels the setting of the touch operation area "A" on the touch panel 7a. In other words, the setting unit 10b cancels the setting of the partial area on the touch panel 7a where the user performed the first touch operation as the touch operation area "A".

The controller display control unit 10c displays a controller image C.

In other words, the controller display control unit (a display control unit) 10c displays a controller image C (an image for touch operations) (see FIG. 5B and the like) corresponding to the control content for reproducing the video (a content) set by the setting unit 10b, at a position on the display panel 6a corresponding to the touch operation area "A". In other words, the controller display control unit 10c displays the controller image C such that the position on the display panel 6a corresponding the touch operation area "A" becomes identifiable.

Specifically, in the case where the first touch operation is a swiping operation, when the setting unit 10b sets the touch operation area "A" and the control content for reproducing the video, the controller display control unit 10c performs on-screen display (OSD) of the controller image C corresponding to the control content on the display panel 6a such that the controller image C overlaps the touch operation area "A".

Figure 5A:
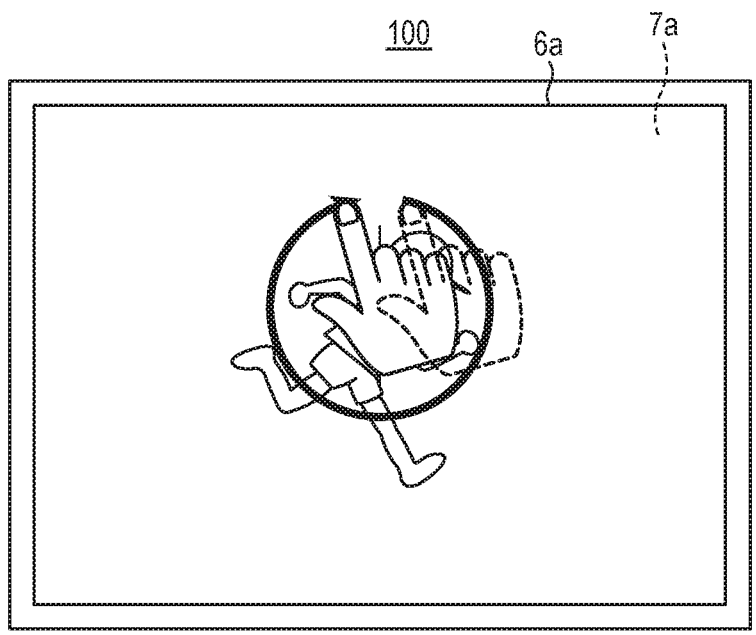
FIGS. 5A and 5B are views for explaining the reproducing process of FIG. 3.

For example, in the case where the feature of the trajectory of the first touch operation detected by the first detecting unit 10a is the trajectory feature "SHAPE: CIRCLE" (see FIG. 5A), when the setting unit 10b sets the control content "FAST/SLOW REPRODUCTION AND SETTING OF START POINT AND END POINT" as a control content for reproducing the video, the controller display control unit 10c performs OSD of a first controller image C1 for setting fast/slow reproduction of frame images, a reproduction start point, and a reproduction end point (see FIG. 5B). For example, the first controller image C1 has a circular shape, and has a size (for example, a diameter) substantially equal to the size of the touch operation area "A", that is, the size of the trajectory of the first touch operation.

Figure 6A:
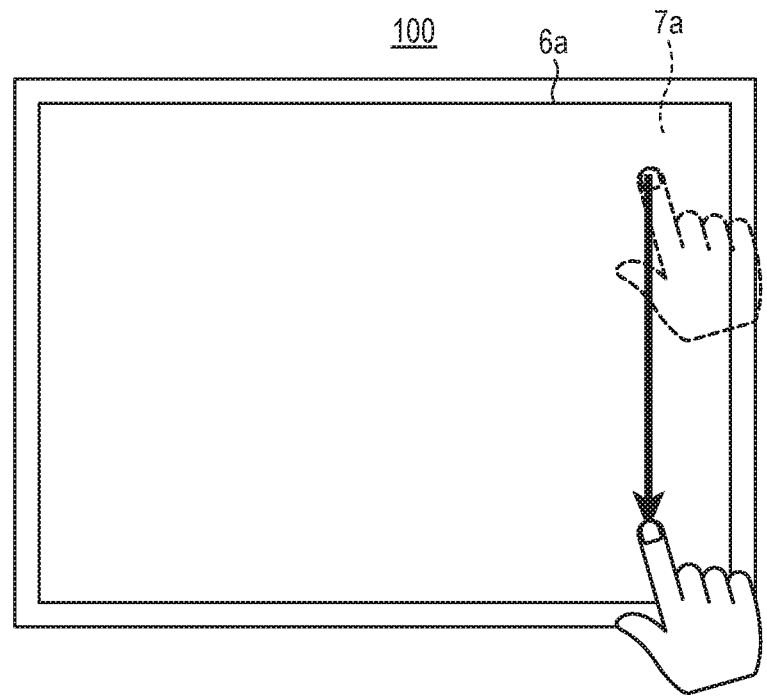
FIGS. 6A and 6B are views for explaining the reproducing process of FIG. 3.

Also, in a case where the feature of the trajectory of the first touch operation detected by the first detecting unit 10a is the trajectory feature "SHAPE: VERTICAL STRAIGHT LINE" (see FIG. 6A), when the setting unit 10b sets the control content "VOLUME ADJUSTMENT" as a control content for reproducing the video, the controller display control unit 10c performs OSD of a second controller image C2 for adjusting volume (see FIG. 6B). For example, the second controller image C2 has a vertically long bar shape, and has a vertical length substantially equal to the length of the touch operation area "A" in the vertical direction, that is, the length of the trajectory of the first touch operation in the vertical direction.

Figure 7A:
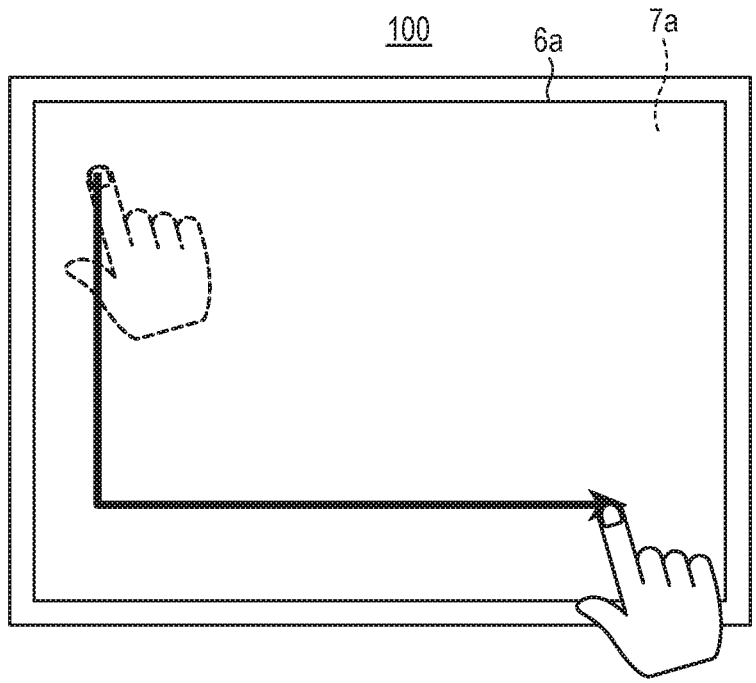
FIGS. 7A and 7B are views for explaining the reproducing process of FIG. 3.

Also, in a case where the feature of the trajectory of the first touch operation detected by the first detecting unit 10a is the trajectory feature "SHAPE: L-SHAPED LINE (HAVING VERTICAL STRAIGHT-LINE SEGMENT AND HORIZONTAL STRAIGHT-LINE SEGMENT)" (see FIG. 7A), when the setting unit 10b sets the control content "SEARCHING OF DISPLAY FRAME" as the control content for reproducing the video, the controller display control unit 10c performs OSD of a third controller image C3 for searching for a frame image (see FIG. 7B). For example, the third controller image C3 has a horizontally long bar shape, and has a horizontal length substantially equal to the horizontal length of the touch operation area "A", that is, the length of the horizontal (x axis direction) straight-line segment of the trajectory of the first touch operation.

Operating methods using the first to third controller images C1 to C3 will be described below.

Figure 8A:
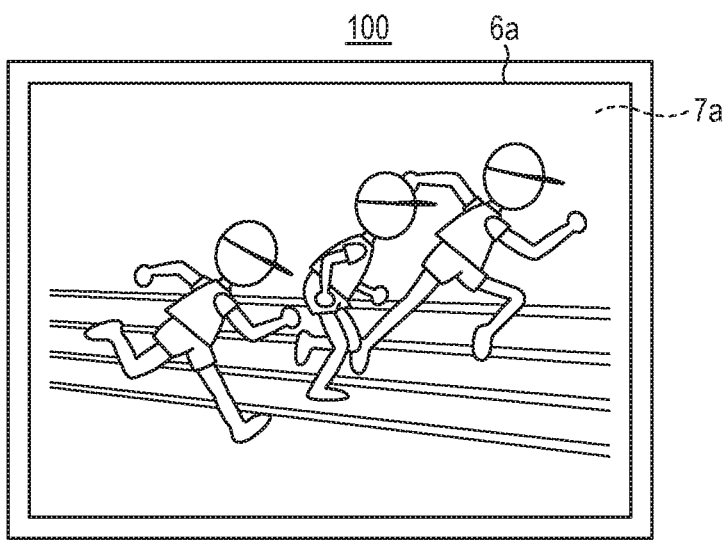
FIGS. 8A, 8B, and 8C are views for explaining the reproducing process of FIG. 3.
Figure 8B:
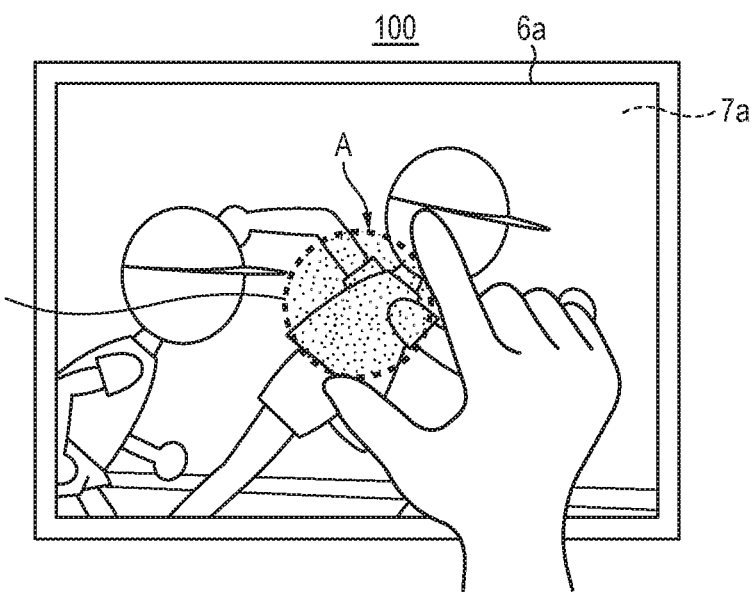

Also, in the case where the first touch operation is a pinch operation, when the setting unit 10b sets the touch operation area "A", the controller display control unit 10c performs OSD of a fourth controller image C4 for moving a portion of the video to be displayed, for example, in a larger size, on the display panel 6a such that the fourth controller image overlaps the touch operation area "A" (see FIGS. 8A and 8B). For example, the fourth controller image C4 has a circular shape, and has a size (for example, a diameter) substantially equal to the size of the touch operation area "A", that is, the length of the trajectory of the first touch operation.

An operating method using the fourth controller image C4 will be described below.

The second detecting unit 10d detects second touch operations.

In other words, when the user performs a second touch operation which is a user's touch operation on the touch operation area "A" of the touch panel 7a, the second detecting unit (a second detecting unit) 10d detects the second touch operation. Specifically, when a controller image C is displayed on the display panel 6a so as to overlap the touch operation area, the second detecting unit detects various user's second touch operations (such as a sliding operation) on the controller image, as second touch operations. For example, when the user touches positions on the touch panel 7a corresponding to the controller image C, and the touch panel 7a outputs position signals related to the X and Y coordinates of the touch positions, the second detecting unit 10d determines whether a second touch operation has been performed, on the basis of the position signals.

The output control unit 10e controls reproduction of the video which is displayed on the display unit 6.

For example, the output control unit 10e includes a video random access memory (VRAM), a VRAM controller, a digital video encoder, and the like (all of which are not shown in the drawings). In this configuration, the digital video encoder reads out a luminance signal Y and color-difference signals Cb and Cr obtained by decoding of the image processing unit 4 and stored in the VRAM, from the VRAM through the VRAM controller, at a predetermined reproduction frame rate (for example, 30 fps), and generates a video signal on the basis of data on those signals, and outputs the video signal to the display panel 6a of the display unit 6.

Also, the output control unit (an output control unit) 10e controls reproduction of the video (output of the content) on the basis of the second touch operation detected by the second detecting unit 10d.

Specifically, in the case where the first touch operation is a swiping operation, when a user's second touch operation on the controller image (an image for touch operations) C is detected by the second detecting unit 10d, the output control unit 10e controls reproduction of the video on the basis of a control content set by the setting unit 10b.

Meanwhile, in a case where the feature of the trajectory of the first touch operation detected by the first detecting unit 10a does not coincide with any preset trajectory feature, or in a case where a touch operation other than the second touch operations is performed in a state where the touch operation area "A" has been set by the setting unit 10b, the output control unit 10e controls reproduction of the video on the basis of a control content different from control contents which are performed on the basis of the second touch operations.

Here, the case where the feature of the trajectory of the first touch operation does not coincide with any preset trajectory feature includes a state where a user's swiping operation has not finished, that is, a state where the user is performing a swiping operation while keeping contact with the touch panel 7a.

In other words, when the user performs a second touch operation on a controller image C overlapping the touch operation area "A" of the touch panel 7a, the output control unit 10e controls reproduction of the video on the basis of a control content set by the setting unit 10b. Meanwhile, when the user performs a touch operation (such as a swiping operation) before a touch operation area "A" is set on the touch panel 7a (before the trajectory of the first touch operation is detected), or performs a touch operation on an area of the touch panel 7a other than the touch operation area "A", the output control unit 10e controls reproduction of the video on the basis of a control content different from the control contents which can be set by the setting unit 10b.

<Method of Operating First Controller Image>

Figure 5B:
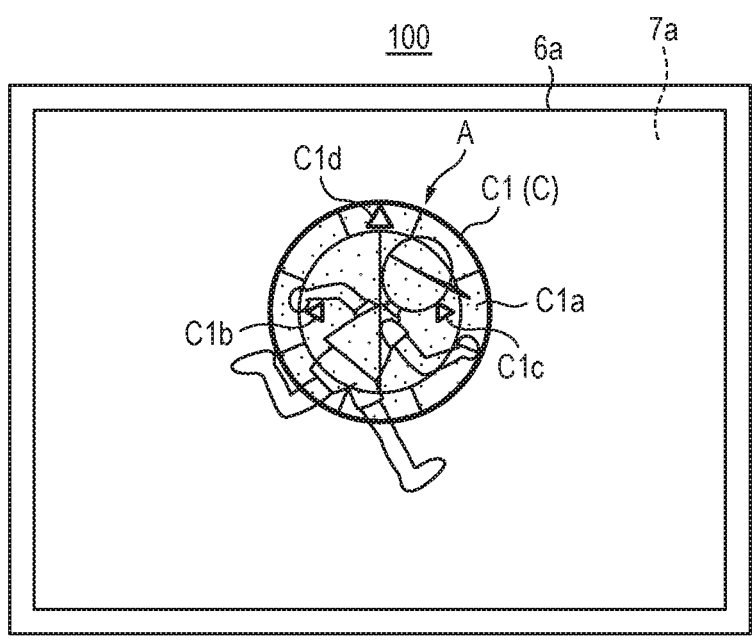

In a case where the control content "FAST/SLOW REPRODUCTION AND SETTING OF START POINT AND END POINT" is set as a control content for reproducing the video by the setting unit 10b, the first controller image C1 is displayed on the display panel 6a (see FIG. 5B).

The first controller image C1 has an outer operation part C1a for fast/slow reproduction having an annular shape. The operation part C1a for fast/slow reproduction is a part enabling the user to perform operations such as arc-shaped clockwise or counterclockwise sliding operations, specifically, an operation of turning in an arc shape for moving an indicator C1d for determining a reproduction point, an operation of turning full circle once or more, and the like. When a clockwise sliding operation is performed on the operation part C1a for fast/slow reproduction, the output control unit 10e performs fast/slow reproduction of the video in a forward direction (see FIG. 9A). Meanwhile, when a counterclockwise sliding operation is performed on the operation part C1a for fast/slow reproduction, the output control unit 10e performs fast/slow reproduction of the video in a backward direction (see FIG. 9B). Also, the operation part C1a for fast/slow reproduction is divided into a predetermined number of equal sections (for example, eight sections), and each section is for an operation for frame forward of the video to a corresponding frame image.

A circular part positioned on the inside (center side) of the operation part C1a for fast/slow reproduction is divided into a left operation part C1b for setting a start point and a right operation part C1c for setting an end point by a vertical line (an up-down line).

In other words, when the user operates the operation part C1a for fast/slow reproduction, the output control unit 10e performs fast/slow reproduction of the video which is displayed on the display panel 6a, and when the user operates the operation part C1b for setting a start point or the operation part C1c for setting an end point when a desired frame image is displayed, the output control unit 10e can set a reproduction start point or a reproduction end point.

Also, when setting of a reproduction start point and a reproduction end point finishes, the controller display control unit 10c finishes display of the first controller image C1.

<Method of Operating Second Controller Image>

Figure 6B:
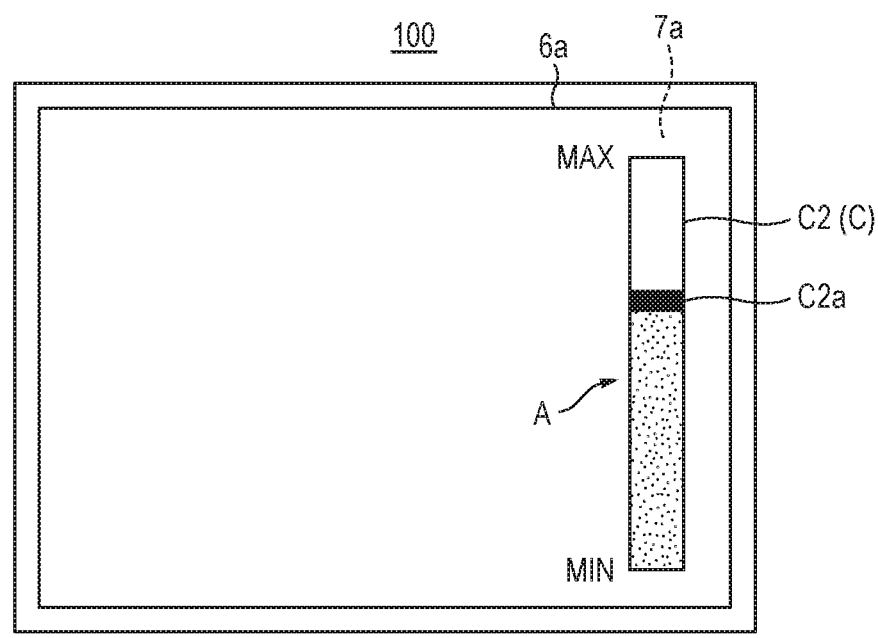

In a case where the control content "VOLUME ADJUSTMENT" is set as a control content for reproducing the video by the setting unit 10b, the second controller image C2 is displayed on the display panel 6a (see FIG. 6B).

The second controller image C2 has, for example, a slider C2a for determining current volume. The slider C2a is movable to a position when the user performs a touch operation (tapping) on the corresponding position. In this state, when a sliding operation to the upper side or lower side of FIG. 6B is performed, the slider C2a moves, whereby the output control unit 10e can determine the current volume of the video which is reproduced.

Also, when the user's touch operation on the second controller image C2 (the slider C2a) is released, the controller display control unit 10c finishes display of the second controller image C2.

<Method of Operating Third Controller Image>

Figure 7B:
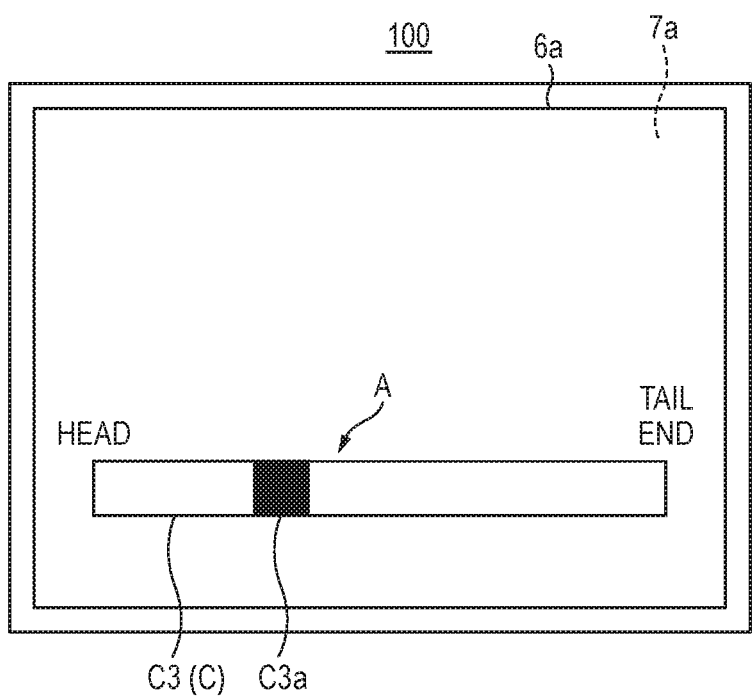

In a case where the control content "SEARCHING OF DISPLAY FRAME" is set as a control content for reproducing the video by the setting unit 10b, the third controller image C3 is displayed on the display panel 6a (see FIG. 7B).

The third controller image C3 has, for example, a slider C3a for designating a frame image to be displayed on the display panel 6a. The slider C3a is movable to a position when the user performs a touch operation (tapping) on the corresponding position. In this state, when a sliding operation to the left side or right side of FIG. 7B is performed, the slider C3a moves, whereby the output control unit 10e performs forward or backward switching of frame images to be displayed on the display panel 6a such that the user can search for a desired frame image.

Also, when the user's touch operation on the third controller image C3 (the slider C3a) is released, the controller display control unit 10c finishes display of the third controller image C3.

<Case where Operation is Performed on Area Other than Controller Image>

For example, in a case where the user performs a touch operation (for example, a swiping operation) before the touch operation area "A" is set on the touch panel 7a, or performs a touch operation on an area of the touch panel 7a other than the touch operation area "A", in response to the user's touch operation, the output control unit 10e performs control for changing the temporal position of the video displayed on the display panel 6a.

Specifically, on the basis of position signals on the X and Y coordinates of touch positions sequentially input according to a user's continuous touch operation on the touch panel 7a, the output control unit 10e sequentially measures operation speeds (the amount of swiping per unit time (for example, the number of touched pixels per second)) and operation directions of the user's touch operation on the touch panel 7a. Then, the output control unit 10e controls the reproduction speed of fast/slow reproduction for changing the temporal position of the video displayed on the display panel 6a, on the basis of the measured operation speeds while controlling the reproduction direction of fast/slow reproduction of the video on the basis of the measured operation directions.

Here, fast/slow reproduction of the video means forward or backward reproduction of the video at a speed higher than or lower than a normal reproduction speed, and the reproduction speed and reproduction direction of the video change according to the operation speed, operation direction, and the like of the user's touch operation on the touch panel 7a. For example, the output control unit 10e changes a reproduction frame rate or a thinning rate such that the reproduction speed of the video increases as the operation speed of the swiping operation increases. Also, in a case where the operation direction is a predetermined direction (for example, a direction to the right), the output control unit performs forward fast/slow reproduction of the video; whereas in a case where the operation direction is the opposite direction to the predetermined direction (for example, a direction to the left), the output control unit performs backward fast/slow reproduction of the video.

Also, in the case where the first touch operation is a pinch operation, on the basis of the first touch operation, the output control unit 10e performs control for displaying a portion of the video displayed on the display panel 6a in a changed size. Specifically, for example, when the user brings two fingers (for example, a forefinger and a thumb) into contact with the touch panel 7a, and then performs a pinch operation of increasing the distance between the fingers (opening the two fingers) (a pinch-out operation), with reference to the two fingers of the user, the output control unit 10e displays a portion of the video displayed on the display panel 6a in a larger size. Meanwhile, when the user brings two fingers (for example, a forefinger and a thumb) into contact with the touch panel 7a, and then performs a pinch operation of decreasing the distance between the fingers (closing the two fingers) (a pinch-in operation), with reference to the two fingers of the user, the output control unit 10e displays a portion of the video displayed on the display panel 6a in a smaller size.

<Method of Operating Fourth Controller Image>

Figure 8C:
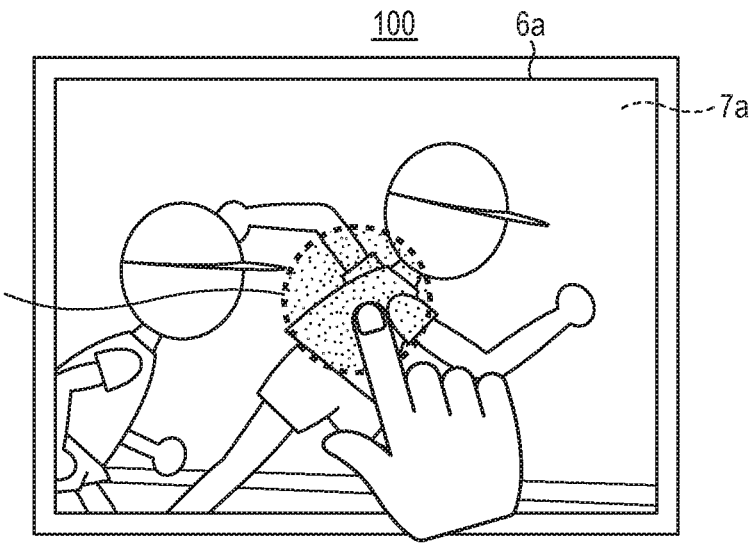

When a second touch operation is detected by the second detecting unit, the output control unit 10e performs control for moving the portion of the video displayed in a changed size on the display panel 6a, that is, control for changing the temporal position of the video (see FIG. 8C).

Specifically, when the user performs a touch operation (tapping) on the fourth controller image C4, and then performs a sliding operation, the output control unit 10e sequentially receives position signals on the X and Y coordinates of touch positions according to the user's continuous sliding operation on the touch panel 7a, and sequentially measure operation amounts and operation directions of the sliding operation on the touch panel 7a on the basis of the position signals. Then, on the basis of the measured operation amounts and the measured operation directions, the output control unit 10e performs control for displacing an image area of the video displayed in the display area of the display panel 6a.

Also, display of the fourth controller image C4 by the controller display control unit 10c may be always performed, and after the user's touch operation on the fourth controller image C4 is released, with elapse of a predetermined time, the size of the fourth controller image C4 may decrease such that display of the fourth controller image C4 finally finishes.

<Reproducing Process>

Now, the reproducing process which is performed by the imaging apparatus 100 will be described with reference to FIG. 3.

Figure 3:
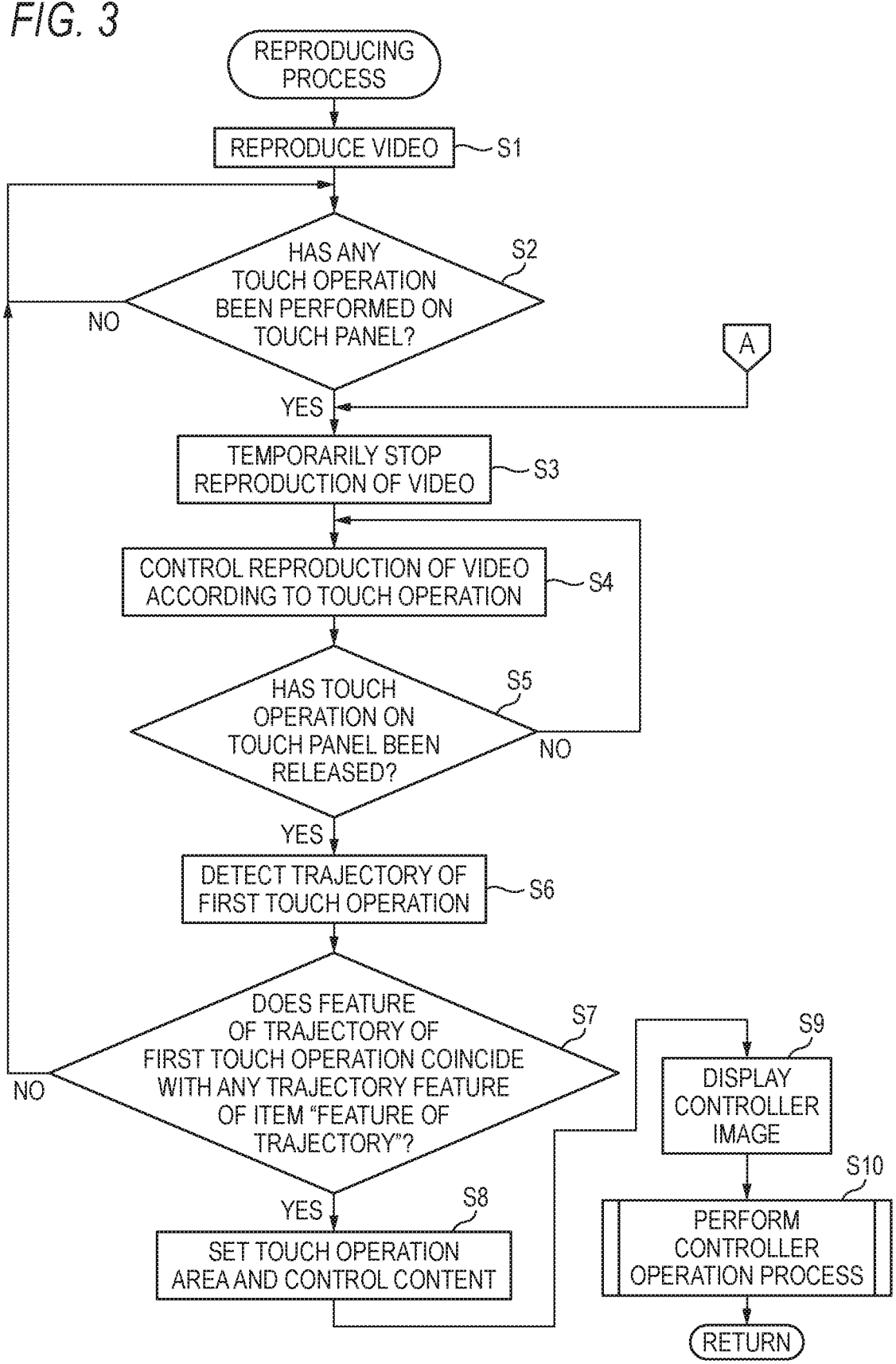
FIG. 3 is a flow chart illustrating an example of an operation related to a reproducing process which is performed by the imaging apparatus of FIG. 1.

FIG. 3 is a flow chart illustrating an example of an operation related to the reproducing process.

As shown in FIG. 3, first, when the user designates one of videos stored in the image storage unit 5 as a reproduction object video by performing a predetermined operation on the operation input unit 7, the image processing unit 4 reads out the designated video from the image storage unit 5, and decodes the read video on the basis of a decoding format, and the output control unit 10e outputs a plurality of frame images constituting the reproduction object video obtained by the decoding of the image processing unit 4, on the display unit 6, thereby reproducing the video on the display panel 6a at the normal reproduction speed (STEP S1).

Also, in advance, the image processing unit 4 performs a process of decoding some frame images of the plurality of frame images constituting the reproduction object video, and then stores the decoded frame images in a predetermined storage means (for example, the memory 2), such that when any one of the frame images is designated from the output control unit 10e, the corresponding frame image can be immediately displayed on the display panel 6a.

Subsequently, the first detecting unit 10a determines whether the user has performed any touch operation on the touch panel 7a (STEP S2). Specifically, the first detecting unit 10a performs the above-described determination on the basis of whether any position signal on the X and Y coordinates of touch positions output from the touch panel 7a according to a user's touch on the touch panel 7a has been input.

When it is determined that any touch operation has not been performed on the touch panel 7a ("NO" in STEP S2), the first detecting unit 10a repeatedly performs the process of determining whether the user has performed any touch operation on the touch panel 7a, at intervals of a predetermined time.

Meanwhile, when it is determined in STEP S2 that a touch operation has been performed on the touch panel 7a ("YES" in STEP S2), the output control unit 10e temporarily stops reproduction of the video while keeping a frame image displayed on the display panel 6a when the user performed the touch operation on the touch panel 7a (STEP S3). Subsequently, in a case where the user's touch operation on the touch panel 7a is a swiping operation, in response to that touch operation, the output control unit 10e performs reproduction control for changing the temporal position of the video displayed on the display panel 6a (STEP S4). Specifically, the output control unit 10e sequentially measures operation speeds and operation directions of the user's touch operation on the touch panel 7a, and controls the reproduction speed of fast/slow reproduction for changing the temporal position of the video displayed on the display panel 6a, on the basis of the measured operation speeds while controlling the reproduction direction of fast/slow reproduction of the video on the basis of the measured operation directions. Meanwhile, in a case where the user's touch operation on the touch panel 7a is a pinch operation, in response to that touch operation, the output control unit 10e performs control for displaying the video displayed on the display panel 6a in a changed size.

Subsequently, the first detecting unit 10a determines whether the user's touch operation on the touch panel 7a has been released (STEP S5). Specifically, the first detecting unit 10a performs the above-described determination on the basis of whether input of position signals on the X and Y coordinates of touch positions from the touch panel 7a has stopped in response to release of the user's touch operation on the touch panel 7a.

When it is determined that the user's touch operation on the touch panel 7a has not been released ("NO" in STEP S5), the output control unit 10e returns the process to STEP S4, and as described above, in response to the user's touch operation on the touch panel 7a, the output control unit performs reproduction control for changing the temporal position of the video displayed on the display panel 6a (STEP S4).

Meanwhile, when it is determined in STEP S5 that the user's touch operation on the touch panel 7a has been released ("YES" in STEP S5), on the basis of position signals on the X and Y coordinates of positions on the touch panel 7a touched by the user until the corresponding touch has been released, the first detecting unit 10a detects the trajectory of the first touch operation (STEP S6).

Also, the output control unit 10e reproduces the video while keeping the reproduction direction and reproduction speed at the release timing of the user's touch operation on the touch panel 7a.

Subsequently, the setting unit 10b determines whether the feature (such as a feature in which the shape of the trajectory is a circle) of the trajectory of the first touch operation detected by the first detecting unit 10a coincides with any preset trajectory feature (such as a trajectory feature "SHAPE: CIRCLE"), with reference to the field of the item "FEATURE OF TRAJECTORY" of the control association table T stored in the table storage unit 9 (STEP S7).

When it is determined that the feature of the trajectory of the first touch operation does not coincide with any preset trajectory feature ("NO" in STEP S7), the first detecting unit 10a returns the process to STEP S2, and as described above, it determines whether the user has performed any touch operation on the touch panel 7a (STEP S2).

Meanwhile, when it is determined in STEP S7 that the feature of the trajectory of the first touch operation coincides with a preset trajectory feature ("YES" in STEP S7), the setting unit 10b sets a touch operation area "A" having a size corresponding to the size of the trajectory of the first touch operation, at a position on the touch panel 7a corresponding to the trajectory of the first touch operation. Also, with reference to the control association table T, the setting unit sets a control content of the item "CONTROL CONTENT" associated with the trajectory feature of the item "FEATURE OF TRAJECTORY" which is the feature of the trajectory of the first touch operation, as a control content for reproducing the video (for example, in a case where the feature of the trajectory of the first touch operation is the trajectory feature "SHAPE: CIRCLE", the control content "FAST/SLOW REPRODUCTION AND SETTING OF START POINT AND END POINT" is set) (STEP S8).

Subsequently, the controller display control unit 10c performs OSD of a controller image C corresponding to the control content set by the setting unit 10b, on the display panel 6a, such that the controller image overlaps the touch operation area "A".

Subsequently, the operation processing unit 10 performs a controller operation process (see FIG. 4) (STEP S10).

Hereinafter, the controller operation process will be described in detail with reference to FIG. 4.

<Controller Operation Process>

Figure 4:
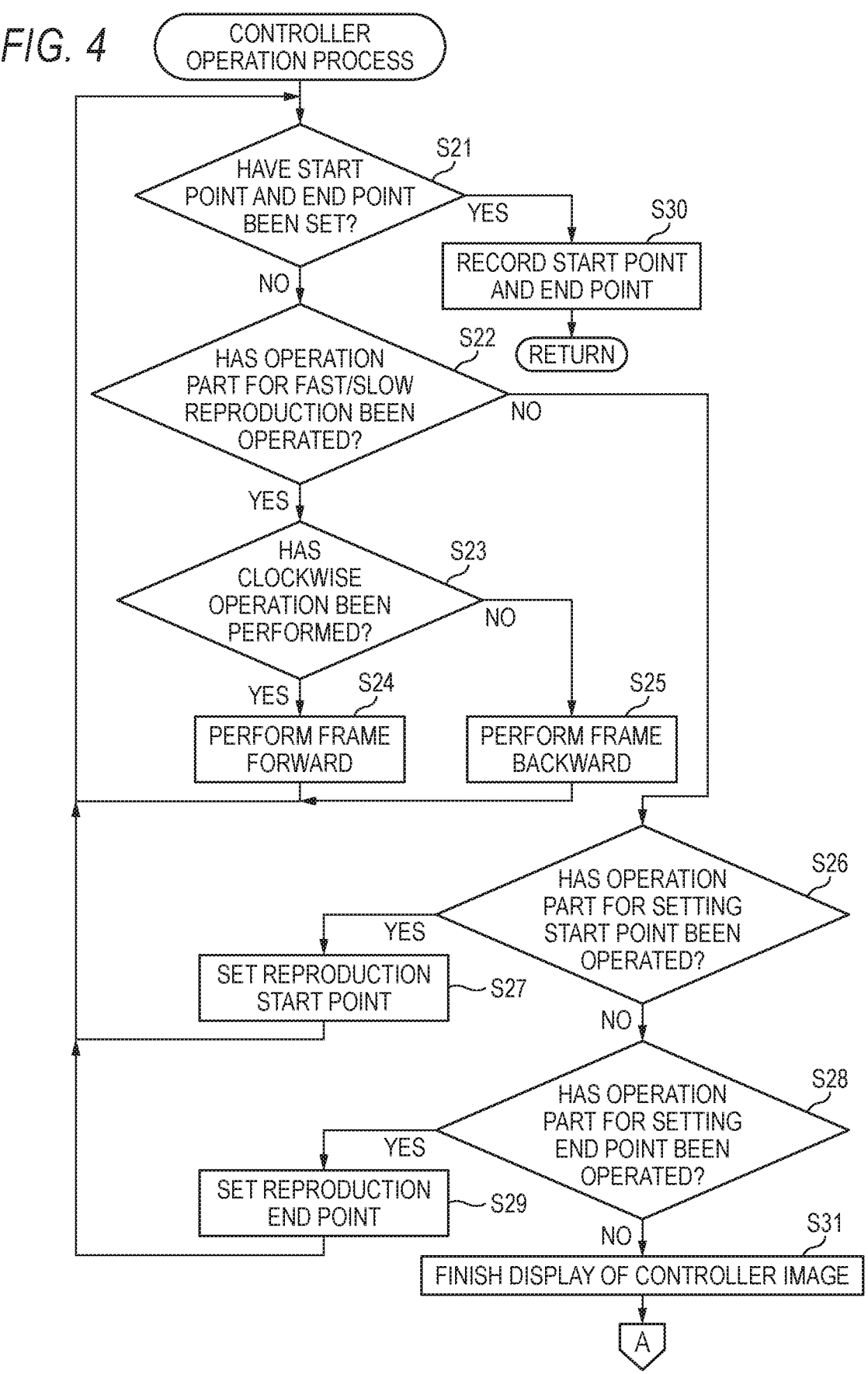
FIG. 4 is a flow chart illustrating an example of an operation related to a controller operation process of the reproducing process of FIG. 3.

FIG. 4 is a flow chart illustrating an example of an operation related to the controller operation process.

Also, for example, in a case where the feature of the trajectory of the first touch operation is the trajectory feature "SHAPE: CIRCLE", the control content "FAST/SLOW REPRODUCTION AND SETTING OF START POINT AND END POINT" is set, and the first controller image C1 is displayed on the display panel 6a. A controller operation process which is performed at that state is shown as an example in FIG. 4.

As shown in FIG. 4, first, the output control unit 10e determines whether a start point and an end point which are a reproduction start point and a reproduction end point of the video have been set (STEP S21).

When it is determined that a start point and an end point have not been set ("NO" in STEP S21), the second detecting unit 10d determines whether the user has operated the operation part C1a of the first controller image C1 for fast/slow reproduction (STEP S22). Specifically, the second detecting unit 10d performs the above-described determination on the basis of whether any position signal on the X and Y coordinates of touch positions output from the touch panel 7a in response to a user's touch operation on positions on the touch panel 7a corresponding to the operation part C1a for fast/slow reproduction has been input.

When it is determined in STEP S22 that the operation part C1a for fast/slow reproduction has been operated ("YES" in STEP S22), the second detecting unit 10d determines whether a clockwise sliding operation has been performed on the operation part C1a for fast/slow reproduction by the user (STEP S23).

Figure 9A:
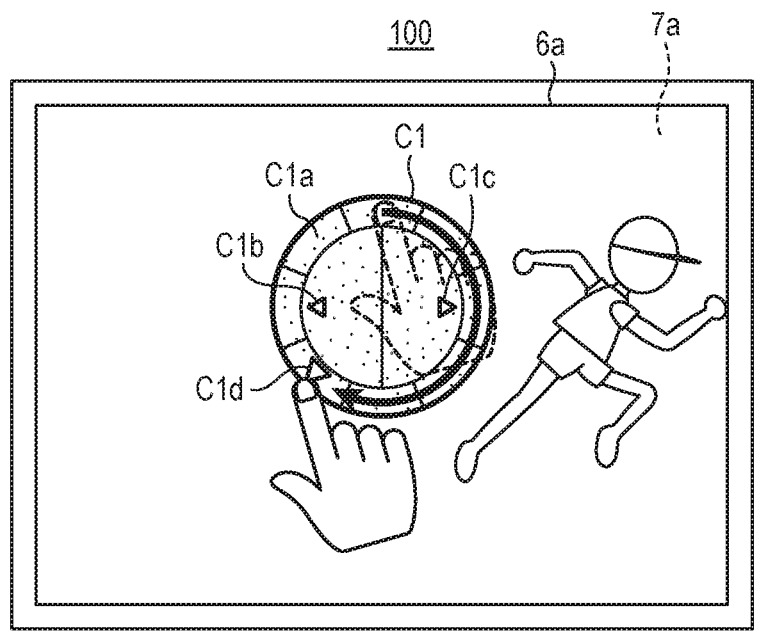
FIGS. 9A and 9B are views for explaining an operating method using a first controller image.

When it is determined that a clockwise sliding operation has been performed on the operation part C1a for fast/slow reproduction ("YES" in STEP S23), the output control unit 10e performs control for performing forward fast/slow reproduction (frame forward) of the video, frame image by frame image (STEP S24) (see FIG. 9A). Subsequently, the output control unit 10e returns the process to STEP S21 in which it determines whether a start point and an end point have been set (STEP S21).

Figure 9B:
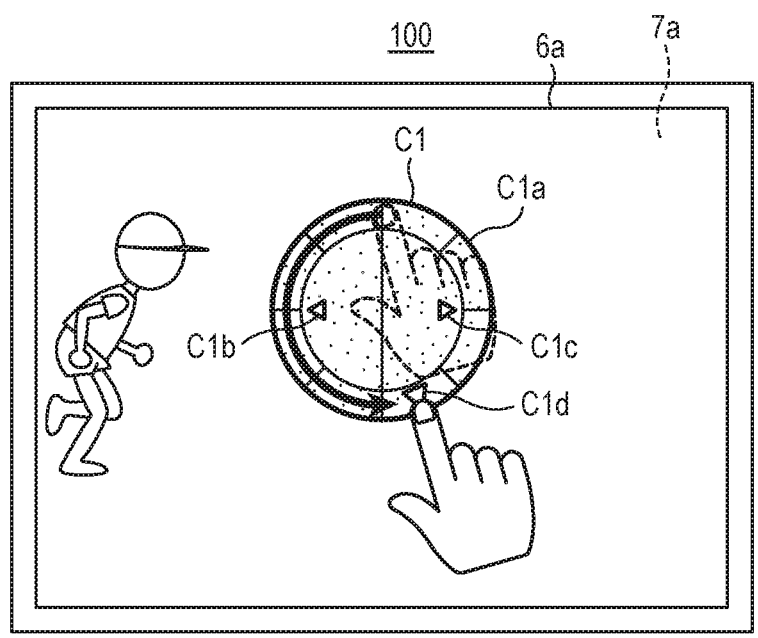

Meanwhile, when it is determined in STEP S23 that a clockwise sliding operation has not been performed on the operation part C1a for fast/slow reproduction ("NO" in STEP S23), that is, a counterclockwise sliding operation has been performed on the operation part C1a for fast/slow reproduction, the output control unit 10e performs control for performing backward fast/slow reproduction (frame backward) of the video, frame image by frame image (STEP S25) (see FIG. 9B). Subsequently, the output control unit 10e returns the process to STEP S21 in which it determines whether a start point and an end point have been set (STEP S21).

When it is determined in STEP S22 that the operation part C1a for fast/slow reproduction has not been operated ("NO" in STEP S22), the second detecting unit 10d determines whether the operation part C1b of the first controller image C1 for setting a start point has been operated by the user (STEP S26). Specifically, the second detecting unit 10d performs the above-described determination on the basis of whether any position signal on the X and Y coordinates of touch positions output from the touch panel 7a in response to a user's touch on the operation part C1b for setting a start point displayed on the touch panel 7a has been input.

When it is determined that the operation part C1b for setting a start point has been operated ("YES" in STEP S26), the output control unit 10e sets a frame image displayed on the display panel 6a at the timing when the operation part C1b for setting a start point was operated, as a reproduction start point of the video (STEP S27). Subsequently, the output control unit 10e returns the process to STEP S21 in which it determines whether a start point and an end point have been set (STEP S21).

Meanwhile, when it is determined in STEP S26 that the operation part C1b for setting a start point has not been operated ("NO" in STEP S26), the second detecting unit 10d determines whether the operation part C1c of the first controller image C1 for setting an end point has been operated by the user (STEP S28). Specifically, the second detecting unit 10d performs the above-described determination on the basis of whether any position signal on the X and Y coordinates of touch positions output from the touch panel 7a in response to a user's touch on a position of the touch panel 7a corresponding to the operation part C1c for setting an end point has been input.

When it is determined that the operation part C1c for setting an end point has been operated ("YES" in STEP S28), the output control unit 10e sets a frame image displayed on the display panel 6a at the timing when the operation part C1c for setting an end point was operated, as a reproduction end point of the video (STEP S29). Subsequently, the output control unit 10e returns the process to STEP S21 in which it determines whether a start point and an end point have been set (STEP S21).

When a start point and an end point which are a reproduction start point and a reproduction end point of the video are set in the above-described way, in STEP S21, it is determined that a start point and an end point have been set ("YES" in STEP S21). Then, the controller display control unit 10c finishes display of the first controller image C1. Thereafter, the output control unit 10e outputs the set start point and the set end point to a predetermined storage means (for example, the memory 2), thereby storing them (STEP S30), and then finishes the controller operation process.

Also, when it is determined in STEP S28 that the operation part C1c for setting an end point has not been operated ("NO" in STEP S28), the controller display control unit 10c finishes display of the first controller image C1 (STEP S31). Thereafter, the process returns to STEP S3 of FIG. 3.

Although the process from STEP S3 is the same as that described above, and thus a detailed description thereof will not be made, after temporarily stopping reproduction of the video (STEP S3), the output control unit 10e performs reproduction control for changing the temporal position of the video on the basis of the user's touch operation on the touch panel 7a (STEP S4). Thereafter, as described above, when it is determined that the user's touch operation on the touch panel 7a has been released ("YES" in STEP S5), the first detecting unit 10a newly detects the trajectory of the first touch operation (STEP S6). Thereafter, as described above, when it is determined that the feature of the trajectory of the first touch operation coincides with a preset trajectory feature ("YES" in STEP S7), the setting unit 10b sets a touch operation area "A" and sets a control content for reproducing the video (STEP S8). Then, the controller display control unit 10c performs OSD of a controller image C corresponding to the set control content (STEP S9), and the operation processing unit 10 performs the controller operation process (see FIG. 4) as described above (STEP S10).

As described above, according to the imaging apparatus 100 of the present embodiment, a touch operation area "A" having a shape according to the trajectory of a first touch operation is set on the touch panel 7a. More specifically, a touch operation area "A" is set at a position on the touch panel 7a corresponding to the trajectory of a first touch operation. Then, when a second touch operation is performed on the set touch operation area "A", reproduction of the video is controlled. Therefore, for example, in a case where the user wants to change the reproduction direction or reproduction speed of the video, the user can set a touch operation area "A" having a desired size at a desired position by operating the touch panel 7a, and can more easily perform control on reproduction of the video by performing a second touch operation on the set touch operation area "A".

Also, it is possible to display a position on the display panel 6a corresponding to a touch operation area "A", for example, by a controller image (an image for touch operations) C, such that the position becomes identifiable, and thus the user can more easily perform a second touch operation in the touch operation area "A".

Also, it is possible to store a plurality of trajectory features of first touch operations and a plurality of control contents for reproducing videos in association with each other, in advance, and in a case where the trajectory of a first touch operation coincides with a preset trajectory feature stored in advance, it is possible to set a touch operation area "A" having a size according to the size of the trajectory of the corresponding first touch operation, and it is possible to set a control content associated with the feature of the trajectory of the first touch operation. Further, it is possible to display a controller image C corresponding to the control content for reproducing the video, at a position on the display panel 6a corresponding to the touch operation area "A", and control reproduction of the video on the basis of the control content corresponding to the controller image C when a second touch operation is performed on the controller image C.

Also, in a case where the trajectory of the first touch operation does not coincide with any preset trajectory feature, or a touch operation other than various second touch operations is performed in a state where the touch operation area "A" has been set, it is possible to perform control on the reproduction speed and reproduction direction of the video on the basis of a control content different from the control contents which are performed on the basis of various second touch operations, for example, on the basis of the operation speed and operation direction of the user's touch operation, and the user can change the temporal position of the video by an intuitive operation.

Also, in a case where a first touch operation is a pinch operation, it is possible to set a touch operation area "A" having a size corresponding to the size of the trajectory of the first touch operation, for example, a size according to the distance between two fingers of the user, and the user can set a touch operation area "A" by an intuitive operation. In this case, since reproduction of the vide is controlled on the basis of the first touch operation, it is possible to control reproduction of the video on the basis of a control content according to the intuitive operation of the user, and it is possible to perform control for displaying a portion of the video displayed on the display panel 6a, in a changed size.

Further, in response to a second touch operation, control for moving the portion of the video displayed in the changed size is performed. Therefore, in a state where a portion of the video is displayed on the display panel 6a, the user can change the temporal position of the video by an intuitive operation.

Also, when the second touch operation finishes, the setting of the touch operation area "A" on the touch panel 7a is released. Therefore, it is possible to suppress the touch operation area "A" from being erroneously operated by the user, and thus it is possible to improve usability.

Also, the present invention is not limited to the above-described embodiment, and various improvements and design changes may be made to the embodiment without departing from the scope of the present invention.

For example, in the above-described embodiment, the controller images C are set on the basis of the control contents for reproducing videos. However, this is an example, and the present invention is not limited thereto, and one controller image may be used. Specifically, it is possible to use the first controller image C1 and set a control content on the basis of a first touch position (tapping position) of the user and the operation direction of an arc-shaped sliding operation. For example, in a case where the first tapping position is on the upper side and the sliding operation is a clockwise operation, the control content "FAST/SLOW REPRODUCTION AND SETTING OF START POINT AND END POINT" may be set, and in a case where the first tapping position is on the upper side and the sliding operation is a counterclockwise operation, the control content "SEARCHING OF DISPLAY FRAME" may be set, and in a case where the first tapping position is on the lower side, the control content "VOLUME ADJUSTMENT" may be set.

Figure 10A:
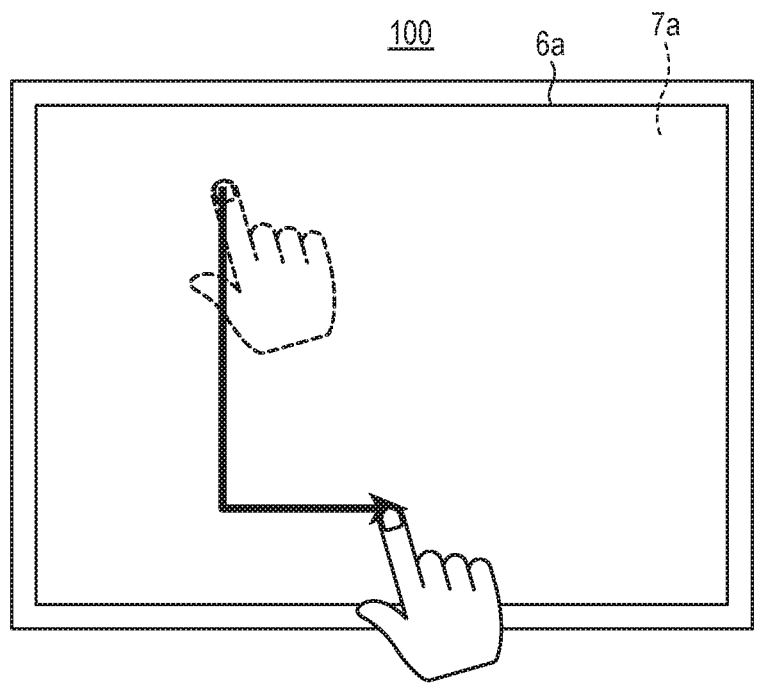
FIGS. 10A and 10B are views for explaining an example of control contents related to the reproducing process of FIG. 3.
Figure 10B:
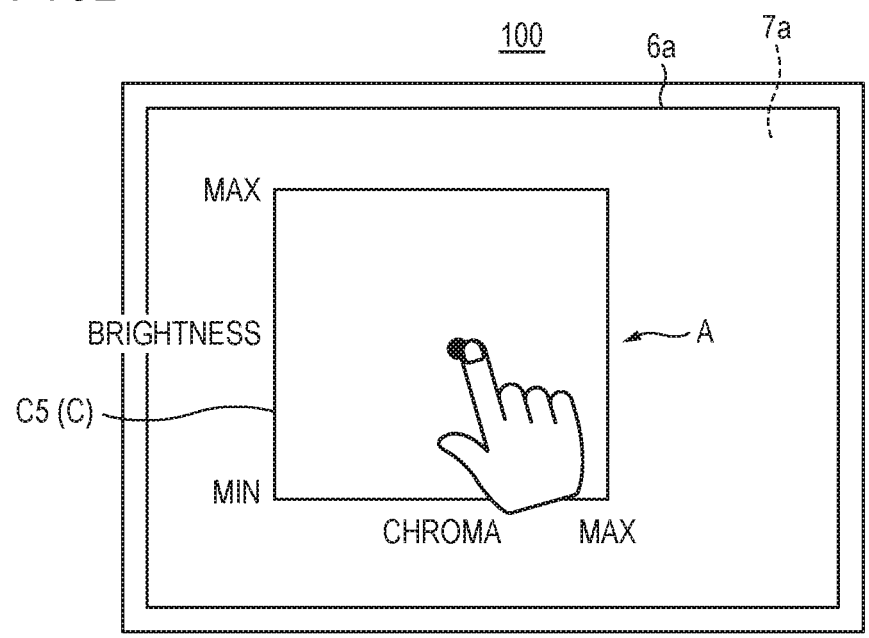

Also, for example, in a case of the trajectory feature "SHAPE: L-SHAPED LINE (HAVING VERTICAL STRAIGHT-LINE SEGMENT AND HORIZONTAL STRAIGHT-LINE SEGMENT)" of the item "FEATURE OF TRAJECTORY" representing a line trajectory shape having a straight line segment extending in the vertical direction (the y axis direction) and a straight line segment extending in a horizontal direction (an x axis direction) (see FIG. 10B), the directions of the straight line segments may be assigned to different control contents, respectively. Specifically, as shown in FIG. 10B, as image quality adjustment parameters, for example, brightness and chroma may be assigned to a y axis and an x axis, respectively, such that it is possible to adjust brightness and chroma in a two-dimensional space.

Further, it is possible to set a control content on the basis of the number of first touch operations performed consecutively. In this case, when the user consecutively performs first touch operations, the user may consecutively perform touch operations while keeping contact with the touch panel 7a, or may perform one first touch operation, and temporarily release contact with the touch panel 7a, and touch the touch panel 7a again within a predetermined time, and then perform the next first touch operation.

For example, in a case where the shape of the trajectory of a first touch operation is a circle, an operation of turning full circle once may cause a control content "FAST/SLOW REPRODUCTION" to be set, and an operation of turning full circle twice may cause the control content "FAST/SLOW REPRODUCTION AND SETTING OF START POINT AND END POINT" to be set. Also, for example, in a case where the shape of the trajectory of a first touch operation is a straight line, a swiping operation only in a predetermined direction may cause the control content "VOLUME ADJUSTMENT" to be set, and a swiping operation in the opposite direction to the predetermined direction followed by a swiping operation in the predetermined direction may cause a control content "VOLUME ADJUSTMENT AND SOUND QUALITY ADJUSTMENT" to be set, and a swiping operation in the predetermined direction, a swiping operation in the opposite direction to the predetermined direction, and a swiping operation in the predetermined direction which are consecutively performed may cause a control content "VOLUME ADJUSTMENT AND HIGH PITCH SOUND ADJUSTMENT AND LOW PITCH SOUND ADJUSTMENT" to be set.

Also, although a sliding operation in the vertical direction (the y axis direction) has been taken as an example of a first touch operation having a straight line shape as its trajectory shape, for example, in a case where the reproduction speed or reproduction direction of a video is not changed on the basis of the operation speed, operation direction, and the like of a user's touch operation, a swiping operation in the horizontal direction (the x axis direction) may be used.

Further, the configuration of the imaging apparatus 100 shown in the above-described embodiment is illustrative, and the present invention is not limited thereto. Also, although the imaging apparatus 100 has been taken as an example of the output control apparatus, the imaging apparatus is illustrative, and the present invention is not limited thereto. For example, whether to provide an imaging function can be appropriately and arbitrarily determined.

Also, although control for reproducing videos has been descried as an example of content output control, it is illustrative, and the present invention is not limited thereto and can be appropriately and arbitrarily modified. For example, in a case of displaying a slide show of a plurality of still images, the switching speed, the switching direction, and the like may be controlled, and in a case of displaying a Web page or an application screen, the scrolling speed, the scrolling direction, and the like may be controlled, and in a case of producing music and the like, the music-piece switching speed, the switching direction, the volume, and the like may be controlled. Even in these cases, it is possible to more easily perform control on content output.

Also, in the above-described embodiment, the functions of the first detecting unit, the setting unit, the second detecting unit, and the output control unit are implemented by driving the first detecting unit 10a, the setting unit 10b, the second detecting unit 10d, and the output control unit 10e under control of the central control unit 1. However, the present invention is not limited thereto, and those functions may be implemented by executing a predetermined program or the like by the CPU of the central control unit 1.

In other words, a program including a first detecting process routine, a setting process routine, a second detecting process routine, and an output control process routine may be stored in a program memory (not shown in the drawings) in advance. In this case, the first detecting process routine may make the CPU of the central control unit 1 implement the function of detecting the trajectory of a first touch operation which is a touch operation which the user performs while keeping contact with the touch panel (a touch input unit) 7a. Also, the setting process routine may make the CPU of the central control unit 1 implement the function of setting a touch operation area "A" having a shape according to the trajectory of the first touch operation detected, on the touch panel 7a. Also, the second detecting process routine may make the CPU of the central control unit 1 implement the function of detecting a second touch operation which is a touch operation on the set touch operation area "A". Also, the output control process routine may make the CPU of the central control unit 1 implement the function of controlling content output on the basis of the detected second touch operation.

Further, as a computer-readable storage medium which retains the above described program for implementing the individual processes, besides a ROM and a hard disk drive, a non-volatile memory such as a flash memory, and a portable storage medium such as a CD-ROM can also be applied. Also, as a medium for providing data on the program through a desired communication line, a carrier wave may be applied.

What is claimed is:

1. An output control apparatus comprising:
    a display unit;
    a touch input unit on which a user performs a touch operation; and
    a processor that is configured to:
        detect the number of positions on which one or more first operations are simultaneously performed and the trajectory of the one or more first operations, the first operation being a touch operation which is performed while contact with the touch input unit is kept,
        specify a touch operation area corresponding to the detected number of positions on which the first operation is performed and the detected trajectory of the first touch operation, on the touch input unit,
        perform control for translucently displaying a controller image on a position overlapping the touch operation area on the display unit such that the controller image becomes identifiable,
        detect a second touch operation which is a touch operation performed on the touch operation area on the controller image displayed on the display unit, and
        control content output on the basis of the detected second touch operation.

2. The output control apparatus according to claim 1, wherein:
    in a case where the trajectory of the first touch operation detected coincides with a preset trajectory feature, the processor is configured to specify the touch operation area having a size corresponding to the size of the trajectory of the first touch operation.

3. The output control apparatus according to claim 1, further comprising:
    a display unit; and
    a storage unit in which trajectory features of a plurality of different first touch operations and a plurality of different control contents for outputting contents are stored in association with each other,
    wherein, in a case where the trajectory of the first touch operation detected coincides with any one of the trajectory features recoded in advance in the storage unit, the processor is configured to:
        set the touch operation area and set a control content associated with the feature of the trajectory of the first touch operation,
        perform control for displaying the controller image for touch operation corresponding to the set control content at a position corresponding to the touch operation area on the display unit, and
        in response to the second touch operation on the displayed controller image for touch operation, control content output on the basis of the set control content.

4. The output control apparatus according to claim 3, wherein:
    the content is a video, and
    the processor is configured to:
        set the touch operation area and set a control content for reproducing the video associated with the feature of the trajectory of the first touch operation;
        perform control for displaying the controller image for touch operation corresponding to the control content set for reproducing the video, at the position corresponding to the touch operation area on the display unit; and
        in response to the second touch operation on the displayed controller image for touch operation, control reproduction of the video on the basis of a control content corresponding to the image for touch operation.

5. The output control apparatus according to claim 3, wherein:
    in a case where the feature of the trajectory of the first touch operation detected does not coincide with any one of the preset trajectory features, or a touch operation other than the second touch operation is performed in a state where the touch operation area has been set, the processor is configured to control content output on the basis of a control content different from the control content which is performed on the basis of the second touch operation.

6. The output control apparatus according to claim 3, wherein:
    when the detected second touch operation finishes, the processor is configured to release the setting of the touch operation area on the touch input unit.

7. The output control apparatus according to claim 1, wherein:
    in a case where the first touch operation is a predetermined type of touch operation, the processor is configured to specify the touch operation area having a size according to the size of the trajectory of the first touch operation.

8. The output control apparatus according to claim 1, wherein:

in a case where the first touch operation is a predetermined type of touch operation, the processor is configured to control content output on the basis of the first touch operation.

9. The output control apparatus according to claim 8, further comprising:
a display unit,
wherein the content is a video, and
in a case where the first touch operation is a pinch operation, the processor is configured to perform control for displaying a portion of the video displayed on the display unit in a changed size, on the basis of the first touch operation, and to perform control for moving the portion of the video displayed in the changed size, on the basis of the detected second touch operation.

10. The output control apparatus according to claim 1, wherein:
the processor is configured to specify the touch operation area at a position on the touch input unit corresponding to the trajectory of the first touch operation detected.

11. An output control method using an output control apparatus having a touch input unit on which a user performs a touch operation, comprising:
detecting the number of positions on which one or more first operations are simultaneously performed and the trajectory of the one or more first operations, the first operation being a touch operation which is performed while contact with the touch input unit is kept;
specifying a touch operation area corresponding to the detected number of positions on which the first operation is performed and the detected trajectory of the first touch operation, on the touch input unit;
performing control for translucently displaying a controller image on a position overlapping the touch operation area on the display unit such that the controller image becomes identifiable,
detecting a second touch operation which is a touch operation performed on the touch operation area on the controller image displayed on the display unit; and
controlling content output on the basis of the detected second touch operation.

12. A non-transitory storage medium storing a computer-readable program for controlling a computer of an output control apparatus having a touch input unit on which a user performs a touch operation, the computer-readable program causing the computer to perform:
a function of detecting the number of positions on which one or more first operations are simultaneously performed and the trajectory of the one or more first operations, the first operation being a touch operation which is performed while contact with the touch input unit is kept;
a function of specifying a touch operation area corresponding to the detected number of positions on which the first operation is performed and the detected trajectory of the first touch operation, on the touch input unit;
a function of performing control for translucently displaying a controller image on a position overlapping the touch operation area on the display unit such that the controller image becomes identifiable,
a function of detecting a second touch operation which is a touch operation performed on the touch operation area on the controller image displayed on the display unit; and
a function of controlling content output on the basis of the detected second touch operation.

13. The output control apparatus according to claim 1, wherein the processor is configured to determine a control content of the content output corresponding to the detected number of positions on which the first operation is performed and the detected trajectory of the first touch operation.

* * * * *